United States Patent
Lam (10) Patent No.: US 7,415,892 B2
(45) Date of Patent: Aug. 26, 2008

(54) DISPOSABLE FLOW CHAMBER ELECTRO-MAGNETIC FLOW SENSOR

(76) Inventor: Wing Yin Lam, 24610 Los Adomos, Yorba Linda, CA (US) 92687

( * ) Notice: Subject to any disclaimer, the term of this patent is extended or adjusted under 35 U.S.C. 154(b) by 103 days.

(21) Appl. No.: 11/388,486

(22) Filed: Mar. 24, 2006

(65) Prior Publication Data

US 2007/0220992 A1   Sep. 27, 2007

(51) Int. Cl.
*G01F 1/58* (2006.01)

(52) U.S. Cl. .................................. 73/861.15

(58) Field of Classification Search ............. 73/861.15, 73/861.11, 861.12, 861.13, 861.17; 702/45; 324/204
See application file for complete search history.

(56) References Cited

U.S. PATENT DOCUMENTS

| | | | | |
|---|---|---|---|---|
| 4,503,711 A | * | 3/1985 | Bohn | ................ 73/861.12 |
| 5,852,362 A | * | 12/1998 | Batenburg et al. | .......... 324/204 |
| 6,845,330 B2 | * | 1/2005 | Okuda et al. | ................ 702/38 |
| 6,853,928 B1 | * | 2/2005 | Mitsutake | .................. 702/45 |

* cited by examiner

*Primary Examiner*—Jewel V Thompson (57) ABSTRACT

An electro-magnetic flow sensor, which is arranged for measuring a flow rate of liquid, includes a micro controller and a liquid flowing apparatus communicatively linking to the micro controller. The liquid flowing apparatus includes a flow chamber housing having a flow chamber for receiving the liquid therein, a magnetic source communicating with the flow chamber housing for generating a magnetic field within the flow chamber so as to allow the liquid exposing in the magnetic field, and an array of electrodes alignedly integrated with the flow chamber housing for measuring a voltage magnitude of flow generated in the flow chamber when the liquid flows within the flow chamber under the magnetic field, wherein the micro controller reads the voltage magnitude and converts the voltage magnitude into the flow data of the liquid.

14 Claims, 9 Drawing Sheets

3-D View of Flow chamber with relative position of array electrodes and magnetic source
Cores are shown partially

FIG 1 Disposable Flow Chamber Electro-Magnetic Flow Sensor Signal Processing Circuit Block Diagram

1. Power Supply
2. Micro Processor
3. Opto isolator
4. Coil drive Circuit
5. Coil
6. Magnetic Core
7. Disposable Flow Chamber Housing
8. Pair Of Electrodes
9. Instrumentation Amplifier
10. Summing Circuit
11.
12. Amplifier
13. Analog To digital Converter
14. Opto isolator
15. Signal Switcher
16. Opto isolator
17. Display Or Systems Interface
18. Flow Inlet/Outlet
19. Unit Gain Amplifier
20. Inverting Gain Amplifier.

FIG 2
3-D View of Flow chamber with relative position of array electrodes and magnetic source
Cores are shown partially

FIG 3. Flow chamber View from flow inlet side

FIG 4. View from top

FIG 5. View from Front

FIG 6
3-D View of Flow chamber with relative position of array electrodes, and interconnention of electrodes Note: Magnetic field direction of odd elelctrodes pair are 180 degree phase shift with magnetic field direction present at the even electrodes.

FIG 7
FLOW CHAMBER SOLID MODEL

FLOW CHANNEL WHERE LIQUID CONTACT WITH ELECTRODE

INTERNAL VIEW OF A DISPOSABLE FLOW CHAMBER

FIG 8
TOP BOTTOM AND ELECTRODE,FLOW CHANNEL VIEW

FIG 9  ASSEMBLY TOP AND BOTTOM VIEW OF DISPOSABLE FLOW CHAMBER MAGNETIC FLOW CHAMBER

FIG. 10

FIG. 11

DISPOSABLE FLOW CHAMBER ELECTRO-MAGNETIC FLOW SENSOR

CROSS-REFERENCE OF RELATED APPLICATION

This is a non-provisional application of a provisional application.

BACKGROUND OF THE PRESENT INVENTION

1. Field of Invention

The present invention relates to the art of Fluid Flow Measurement and control for the contamination free environment. This invention is emphasis on Disposable Flow Chamber and Electro-Magnetic Flow Sensor. The Disposable Flow chamber allows isolation of contaminations between sessions. The invention device apply Electro-Magnetic field to the Disposable Flow Chamber then converts the responded signal and to flow speed. It finds particular application in conjunction with volumetric flow sensor, and will be described with particular reference thereto. However, it is to be appreciated that the present invention is also amenable to other like application. Though this invention is particularly suitable for medical drug delivery flow measurement, microelectronic or semiconductor industry, it is also applicable to other industries such as pharmaceutical, biotech industries and other industries, which employ fluid, flow measurement.

2. Description of Related Arts

Fluid flow measurement is used in many industries including water treatment, beverage industries, pharmaceutical industries, biotech industries, medical industries and other general industrial applications. It is critical in many processes to accurately measure small flow without the contaminant residue from previous measurement. This present invention practically and economically contemplates a new technique and apparatus for fluid measurement, which overcomes the problems of contamination.

SUMMARY OF THE PRESENT INVENTION

One objective of the invention is to provide an improved apparatus for measuring liquid flow and still maintain the purity of the liquid. No heat, no chemical additive, no light energy are introduced into the liquid flow. The apparatus consists of Disposable Flow Chamber enclosed in the flow housing, a pair (or multiple pairs) of electrodes, a controllable source of magnetic field, an electrodes switching mechanism, an amplifier circuit, and a micro processor for digital signal processing.

A further object of this invention is to provide a method of constructing the multiple array electrodes within the Flow Chamber. The array structure would provide stronger flow signal.

A further object of this invention is to provide an electrode switching that would help momentarily electrically neutralize the electrodes ionization effect that impairs low frequency signal to noise ratio.

A further objective of this invention is to provide a controllable magnetic source that would allow the micro-processor to remove flow signal from measurement and hence accessing to the noise reference acquisition.

Another advantage and benefit of the present invention is it cost less to produce or manufacture the Disposable Flow Chamber (cost less than a dime to make a Disposable Flow Chamber). The electronic control portion should not cost more than US$ 25.

Still further advantage and benefits, the present invention will become apparent to those of ordinary skill in the art upon reading and understand the following detailed description of the preferred embodiments.

The present invention provides the following advantage over other technology:

(1) This disposable flow chamber can be made very economically.

(2) The structure of this disposable flow chamber is extremely simple.

(3) The replacement process of this disposable piece is extremely easy.

(4) This device can be packed in compact, lightweight, pocket sized.

(5) This device does not need be recalibrated with fluid of varying viscosity.

(6) This device has a very wide flow rate.

(7) This device has high tolerance to environmental factor such as mechanical vibration, movement, temperature, and pressure.

(8) This device can handle mixed liquid:
Liquid with varying viscosity.
Liquid carrying small solid particle.
Liquid of any colors.
Liquid of different temperature.

(9) This device does not add obstacle to the stream of flow.

(10) This device does not need additive seeding to make flow visible.

(11) This device does not release particle to the flow stream.

(12) This device provides the shortest path from flow input to flow output.

In accordance with one aspect of the present invention, an Electro-Magnetic Flow Sensor is provided which solves the issues of past Flow Sensor in small flow that needs a contamination free environment. The Electro-Magnetic Flow Sensor of the present invention increases speed. It increases accuracy. It has a very easy replaceable Disposable Flow Chamber.

This Magnetic Flow Sensor (MagMeter) is designed to measure the flow of electrically conductive fluid in a closed flow chamber. This invention operates on the principal of Faraday's Law of electro magnetic induction. It can be simply stated as:

$$E = \text{constant} \times B \times L \times \text{Speed}$$

Where:
E=magnitude of the voltage.
B=magnetic field density.
L=path length. (Distance between electrodes)
Speed=velocity of fluid.

This equation implies that a voltage is developed when a conductor is passed through a magnetic field. It further stated that the voltage developed is proportional to the density of magnetic field, the length of the conductor, and the velocity of the moving conductor through the B field. Therefore, no moving parts are present in the flow path. In fact, the sensor provides the shortest flow through passage from inlet to outlet. The inner (wetted) areas are completely insolated from outside environment. Hence, it achieves full isolation from outside contaminants. The shortest path is pocket free. It does not trap incoming fluid. This super clean feature is particularly useful in light of high purity requirements of the microelectronic industries. Because of the absence of moveable part, the sensor can be made in a very compact size. Hence it would handle very small flow, and it is suitable be used as hand held personnel equipment. The sensor is used as a standalone apparatus, or it is alternatively integrated into one piece with a controllable valve to provide automatic flow control. The extreme simplicity of the design minimizes size, reduces production cost, increases life time, reduces maintenance effort, improves accuracy, enhances speed, and elevates the safety factor. Prior systems have not provided and adequate methodology for readily responding to higher standards of purity and multiple parameter environment such as variable viscosity, variable temperature, agility environment, and variable pressure environment.

BRIEF DESCRIPTION OF THE DRAWINGS

FIG. 6 illustrates how to connect a multiple array electrodes. This figure also illustrates that magnetic field direction of odd electrodes pair have 180 degree phase shift with magnetic field direction of even electrodes. This magnetic field direction arrangement would allow weak signal to add up as shown in FIG. 6.

DETAILED DESCRIPTION OF THE PREFERRED EMBODIMENT

Figure 1:
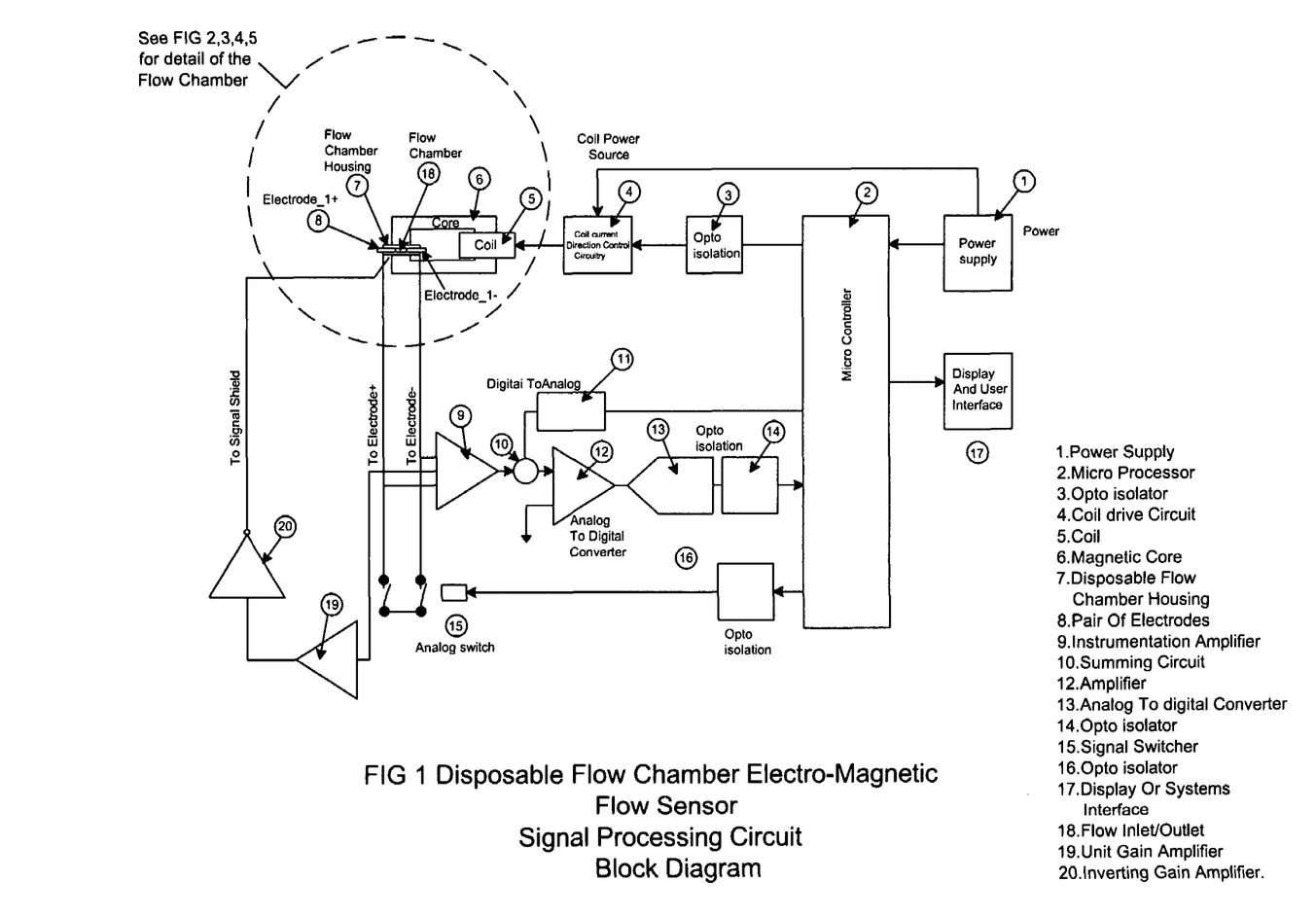
FIG. 1 is a signal processing circuit block diagram of a disposable flow chamber electro-magnetic flow sensor according to a preferred embodiment of the present invention.
Figure 2:
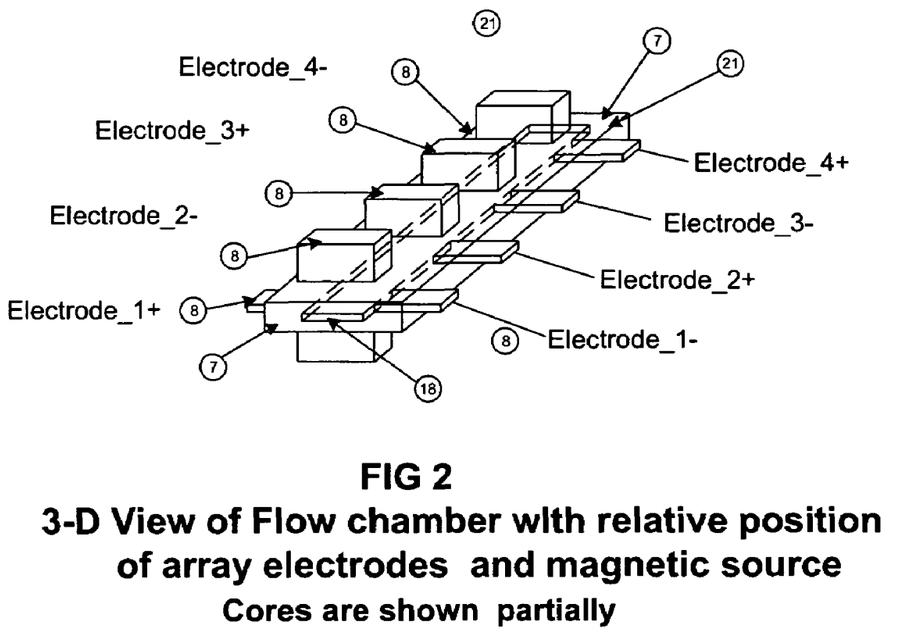
FIG. 2 is a 3-D view of the flow chamber with relative position of array electrodes and magnetic source according to the above preferred embodiment of the present invention, wherein cores are shown partially. For clarity of the relative position of the electrodes and flow chamber, the magnetic core and coil are not shown in FIG. 2.

FIG. 1 is the general block diagram that includes building block of the electronic, a single element of Flow chamber 18 and it associated magnetic circuit. The micro processor 2 controls all the sequence of when to energize the magnetic core, the timing of reading the electrode 8, the timing of amplifier 9 offsetting, and timing of reading pure noise. The detected flow signal is generally composed of both desired signal and several type of undesired noise signal. To remove the effects of undesired signal, we need to know the noise characteristics. This design will employ adaptive filter method to extract the weak suitable noise reference is accessible. It is not the scope of this patent application to explain how adaptive filter work. This patent is rather claiming the apparatus that we use patent will also employ electrodes switching, and magnetic field switching to obtain noise reference as needed by the adaptive filter. This patent will focus of four major claims which are:

(1) Create stronger signal by means of:
Multiple array arrangement.
Thinner flow chamber.

(2) Accessible to noise by means of measuring signal while varying switching signal path, and controlling the magnetic filed.

(3) Shielding the noise by providing a strong known reference that would absorb noise and shielding intruded noise away.

(4) Disposable flow chamber by means of making an easy accessible, replaceable, and economical integrated flow chamber.

Accordingly, a power supply 1 is a DC to DC power supply to provide two power sources. A low noise low power source supplies power to the all the semiconductors. A second high current power source supplies power to the magnetic coil drive.

A micro-controller 2 is a micro-controller that controls the timing of reading data from an optical isolation block 14, timing of energizing the coil in forward direction, reverse direction or off power.

An optical isolation circuit 3 is a circuit that filters out the noise from micro processor, and also securing the microprocessor from surging voltage of the magnetic circuit.

A voltage switching circuit 4 is a circuit that provides forward voltage, reverse voltage or zero power to the coil. This building block receives power from the power supply 1 and switch the polarity forward, reverse or off before connecting the power to the coil 5.

The coil 5 is a copper wounded coil with two leads. Applying forward voltage to the coil would generate a positive magnetic field at the center of the coil 5. Applying reverse voltage to the coil would generate negative magnetic field at the center of the coil 5. The generated magnetic field is guided by a magnetic core 6 to the flow chamber 7.

The magnetic core 6 is made by high magnetic permeability material. This core 6 is guiding the magnetic field generated by the coil 5 to the flow chamber 8. The magnetic field is perpendicular from top to downward direction or from bottom to upward direction. This core 6 provides a magnetic gap to allow the insertion of the flow chamber 18.

The flow chamber housing 7 has a rectangular cross section flow chamber at the center of the housing. The flow chamber has an inlet and outlet. One or multiple pairs of electrodes are placed integrally on the inner side wall of the flow chamber. The flow chamber housing should be made thin to fit in the marrow core gap. Smaller core gap can provide stronger magnetic density with lesser electrical power.

Figure 3:
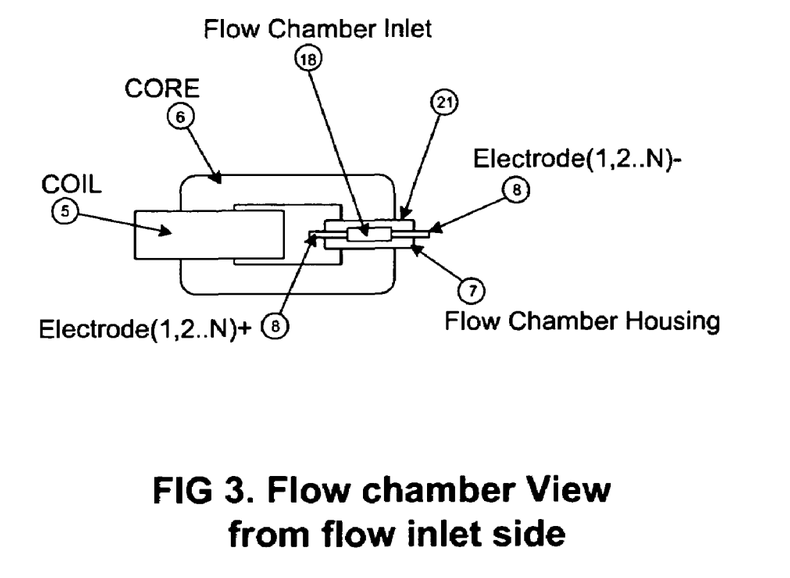
FIG. 3 is a sectional view of the flow chamber from flow inlet side according to the above preferred embodiment of the present invention.
Figure 4:
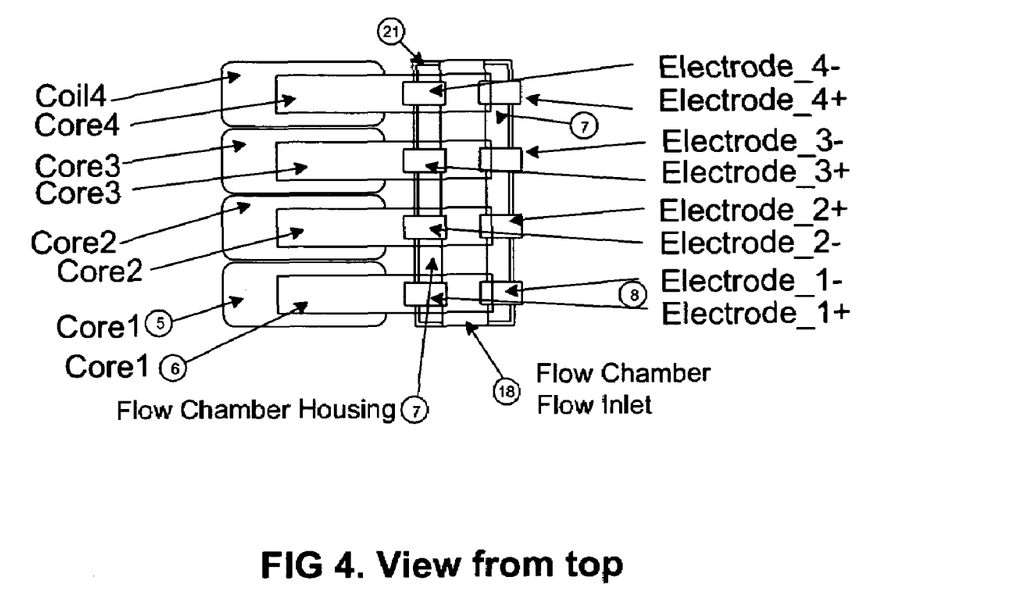
FIG. 4 is a top view of the disposable flow chamber electro-magnetic flow sensor according to the above preferred embodiment of the present invention.
Figure 5:
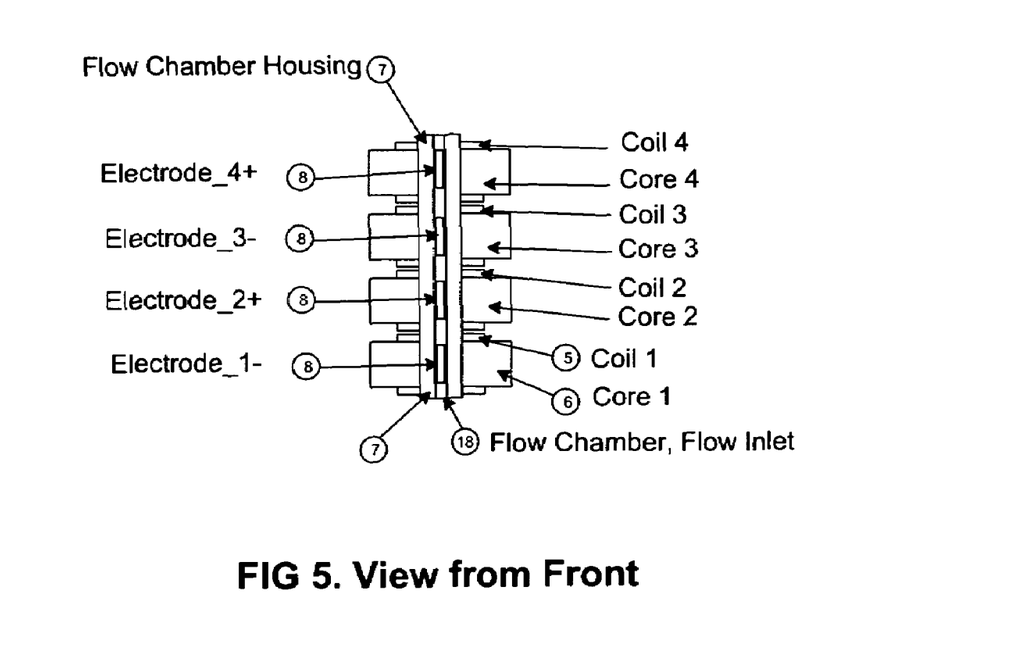
FIG. 5 is a front view of the disposable flow chamber electro-magnetic flow sensor according to the above preferred embodiment of the present invention.
Figure 6:
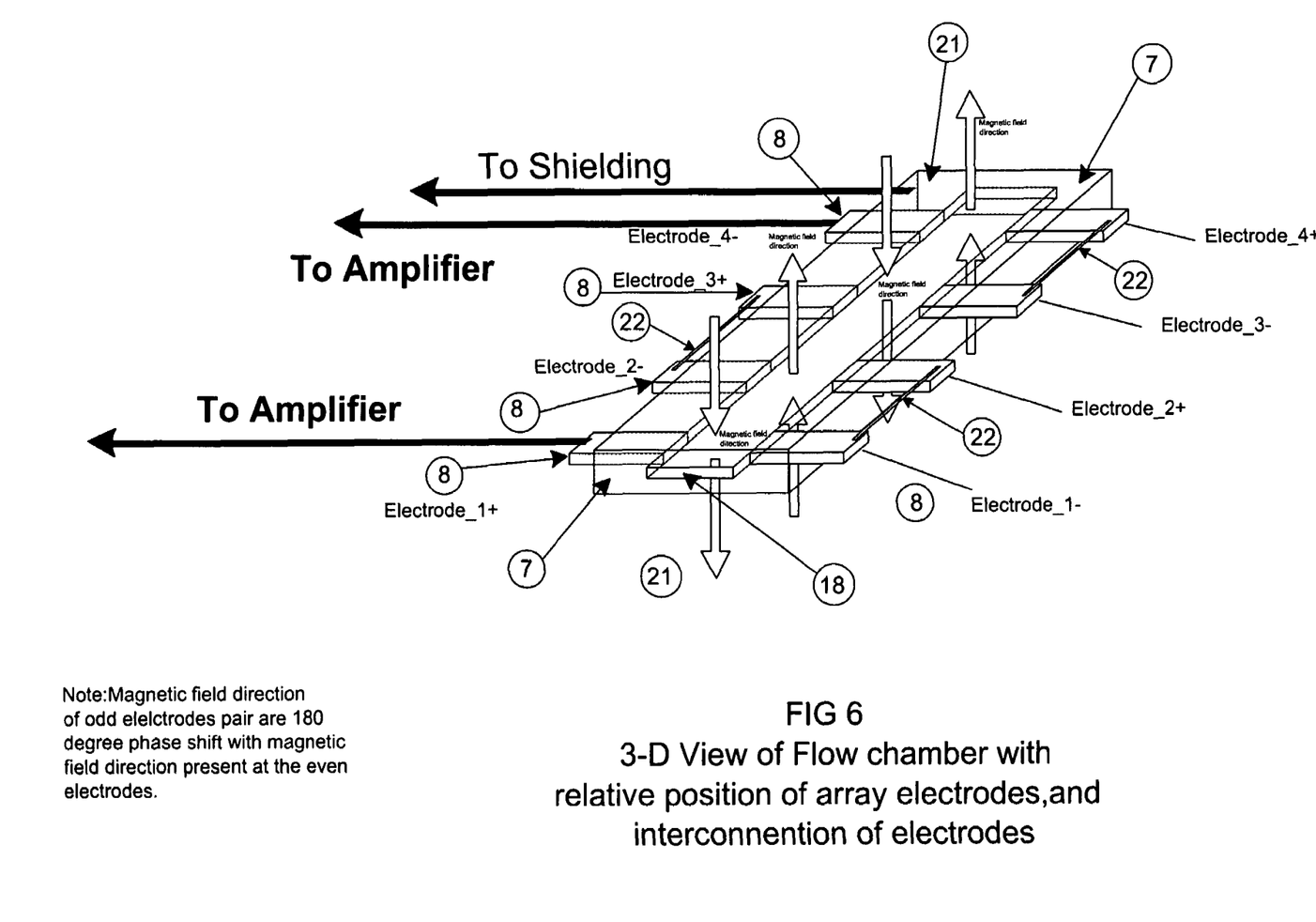
FIG. 6 is a 3-D view of the flow chamber with relative position of array electrodes, and interconnection of electrodes according to the above preferred embodiment of the present invention.

The pair of electrodes 8 runs from inner side wall of the flow chamber housing 7 to outer wall of the flow chamber 18. The flow chamber 18 is constructed so that the flow of liquid run between the two electrodes 8. To handle very slow flow measurement, multiple pairs of electrode 8 can be placed into one single flow chamber housing 7. Connecting 4 pairs of electrodes 8 in series as shown in FIG. 6 would provide a signal of 4 times the strength of the effect of a single electrode 8. FIG. 3 shows the construction of core 6, coil 5, and the flow chamber 18 of elevation view from inlet side. FIG. 4 shows the front view election where user would insert or remove the flow chamber from the core magnetic gap. FIG. 5 illustrates the preferred way to connect several pairs of electrode in series. The outer wall of the flow chamber housing 7 is wrapped with a conductive foil that will be connected to the shield wire 21 from the electronic.

An amplifier 9 is an instrumentation amplifier that has a programmable gain. The amplifier 9 has a means potential electrode+ and electrode− (i.e. =(sum of voltage of electrode+ plus electrode−) divided by 2). This sum of electrodes potential is buffered by unit gain amplifier 19 then inverted by an amplifier 20 and then the output amplifier 20 is used as signal shield to connect to outer wall of the flow chamber housing 7.

A node 10 is a summing node that adds the signal output of amplifier 9 and output of digital to analog converter 11.

The converter 11 is a digital to analog converter that provides a voltage that makes the output of amplifier 12 stay within the rail of power supply.

The amplifier 12 is a high gain amplifier that provides a measurement voltage to the analog to digital converter 13.

The converter 13 is an analog to digital converter that converts analog electrodes' signal to digital value for further signal processing.

The optical isolation block 14 isolates microprocessor's noise to the analog circuitry.

A switch 15 is an analog switch controlled by microprocessor. This switch 15 time to time shorting out the electrode to the signal shield. Building up of attachment floating ion within the liquid would create an unwanted bias offset between the electrodes. This analog switch 15 put all the electrodes to same voltage potential.

The optical isolation block 16 isolates microprocessor noise to the switch 15.

A user interfacing means 17 is a display or user interface connector. Method of interface with user is not the scope of this patent application.

FIGS. 2, 3, 4, and 5 are the mechanical structure of an array of 4 pairs of electrodes along with the Disposable Flow Chamber. The electrodes, flow chamber, and the Chamber Shield are one integrated piece. A single element array consists of 1 pair of electrode, one core and one coil. A two-element array consists of 2 pairs of electrodes, two cores and two coils. So as N element array consists of N pairs of electrodes, N cores and N coils. The drawings are dimensionless. The integrated flow chamber 18 and electrodes pairs can be only a few microns to a few centimeters. A typical drug delivery application would need a flow chamber 18 of thickness not more than one millimeter. The overall thickness of the flow chamber housing 7 would not exceed ⅓ the dimension of the width.

Figure 7:
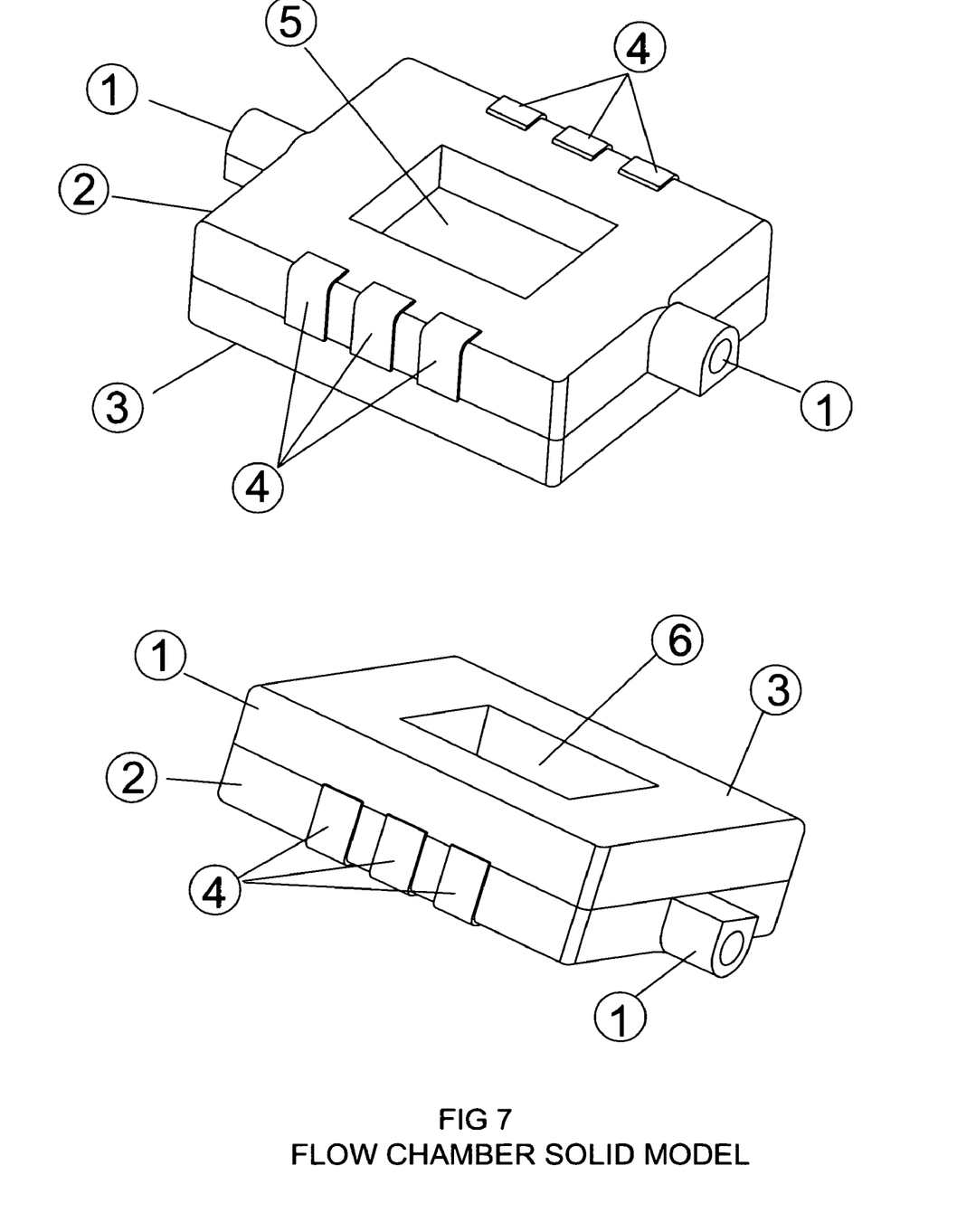
FIG. 7 is a perspective view of the disposable flow chamber electro-magnetic flow sensor according to the above preferred embodiment of the present invention, illustrating the solid model of the flow chamber.
Figure 8:
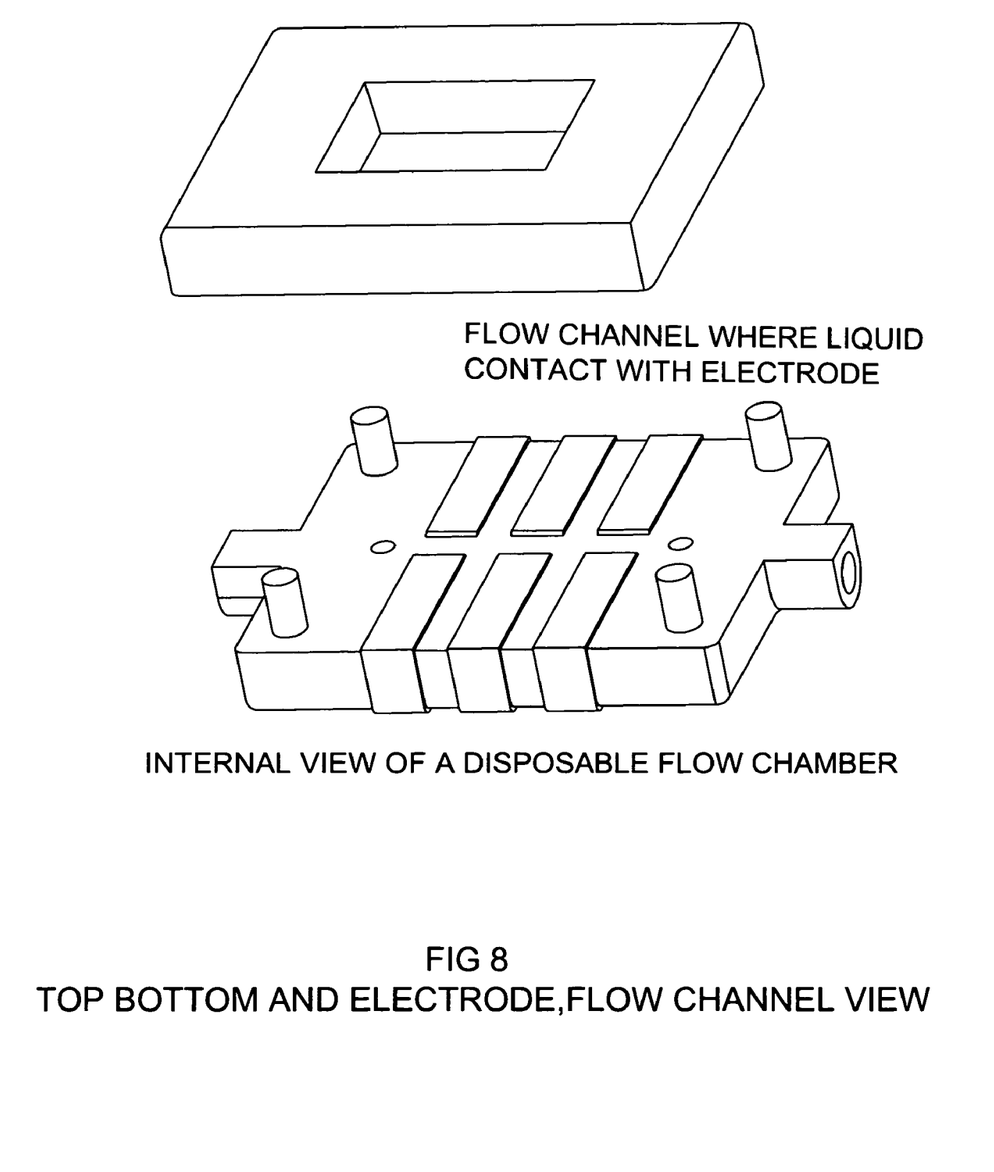
FIG. 8 is an exploded perspective view of the disposable flow chamber electro-magnetic flow sensor according to the above preferred embodiment of the present invention, illustrating the flow channel.

FIG. 7 shows the prototype of the disposable chamber in 3 dimension frame and solid model. In FIG. 7, reference 1 is bi-directional liquid (drug, or other chemical) inlet/outlet. Reference 2 is bottom part of the disposable flow chamber. It is made of medical grade plastic, PVDF or Teflon. Other non-conductive material can also be used for less contaminant sensitive application. The flow inlet leads liquid to the flow channel. The flow channel exposes the liquid in magnetic field perpendicular to the flow direction. Reference 3 is the top cover of flow chamber. Reference 4 is Stainless steel electrodes. This design uses 3 set of electrode sandwiched between the top cover 3 and bottom structure. These electrodes contact with the flow liquid. Each pair of electrodes picks up the electrical field perpendicular to the flow direction. This electrical field is also perpendicular to the magnetic field. These electrodes can be made of other conductive material such as platinum, carbon, gold, or other low corrosive alloy. Reference 5 is the seating place of the permanent magnet external the bottom flow chamber. Reference 6 is the seating place of the permanent magnet external the top flow chamber. Reference 8 is internal view of the disposable flow chamber. Top cover and bottom chamber can be snapped together and sandwiching the electrode and flow channel.

Figure 9:
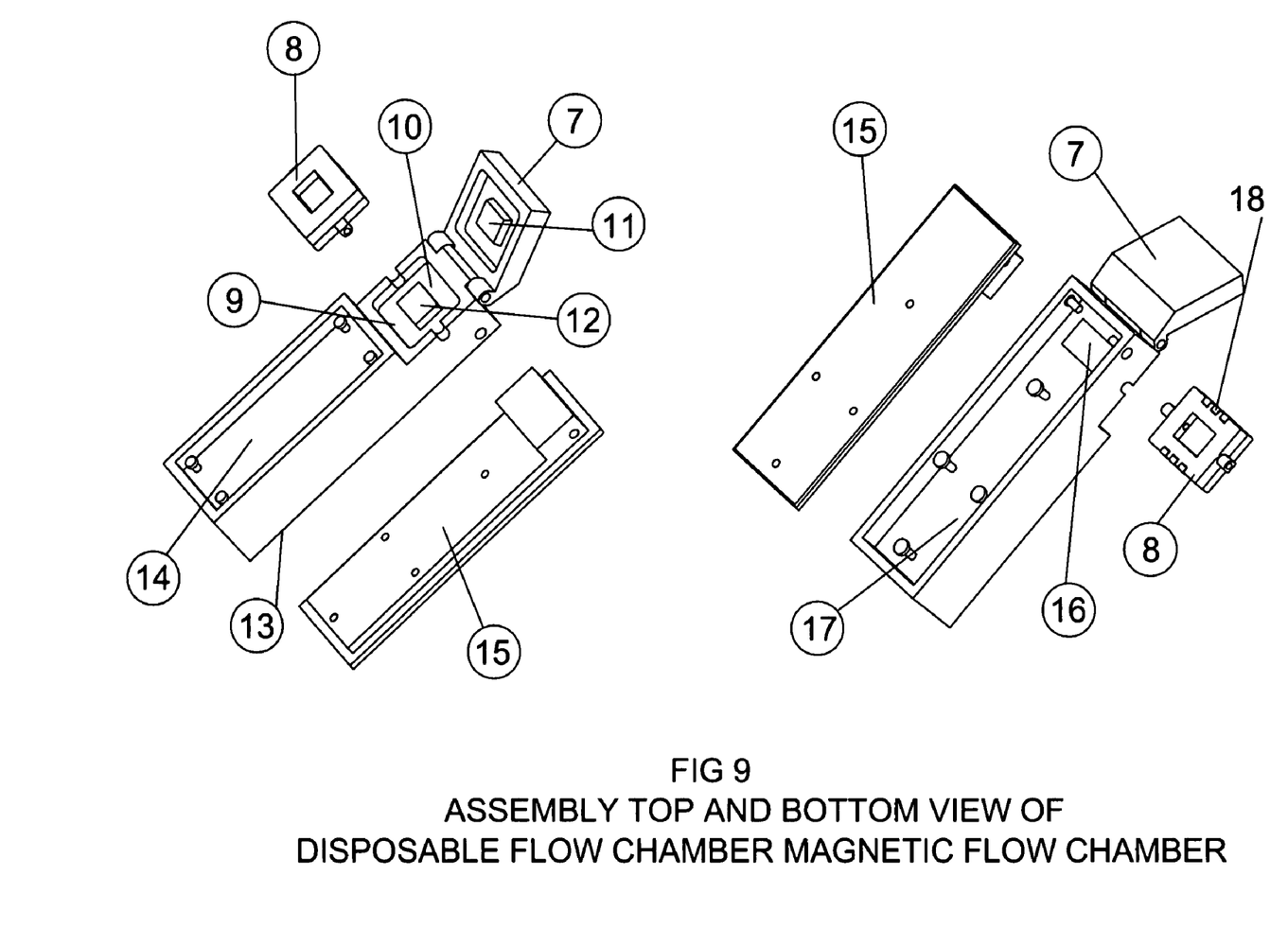
FIG. 9 is an exploded perspective view of the disposable flow chamber electro-magnetic flow sensor according to the above preferred embodiment of the present invention, illustrating the assembly of the disposable flow chamber magnetic flow chamber.
Figure 10:
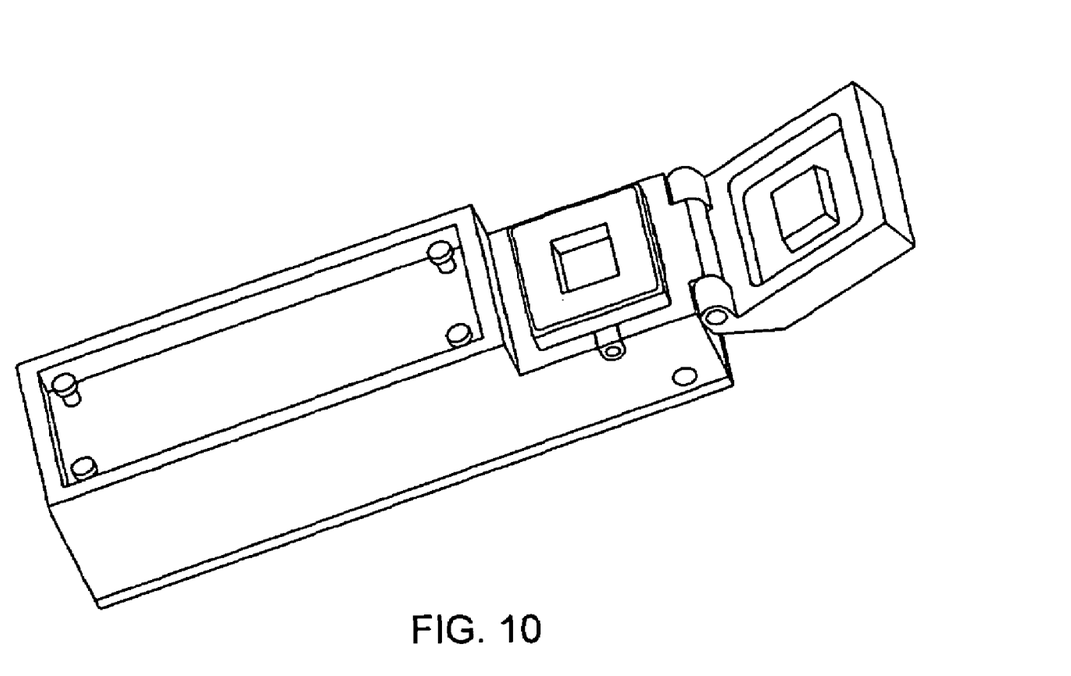
FIG. 10 is a perspective view of the disposable flow chamber electro-magnetic flow sensor according to the above preferred embodiment of the present invention, illustrating the seat cover being opened.
Figure 11:
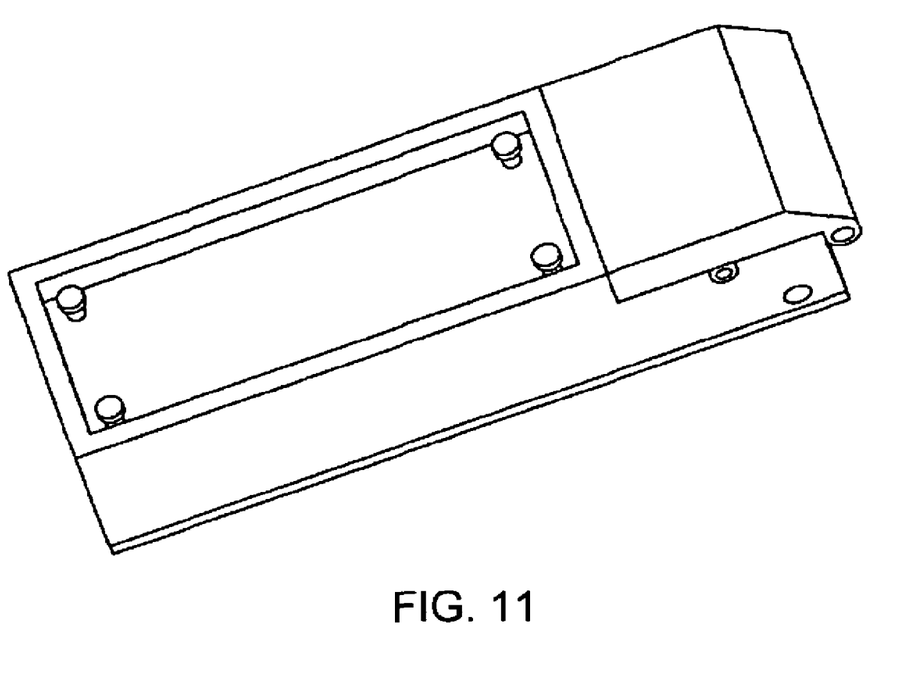
FIG. 11 is a perspective view of the disposable flow chamber electro-magnetic flow sensor according to the above preferred embodiment of the present invention, illustrating the seat cover being closed.

FIG. 9 is the electronic housing of the flow sensor. This electronic housing has a seating place 9 for the disposable flow chamber, a seating place cover 7 to keep the disposable chamber from fall out of the seat, and to keep pressure of the contact between the disposable flow chamber 8 and the bottom seat contact 10. Reference 11 is a permanent magnet fastened to the inner cover. Reference 12 is a permanent magnet fastened to the inner bottom seat. Reference 13 is the body of the flow sensor electronic housing. Within this housing it holds, the PC boards of the sensor, display unit and interface. Reference 14 is the top PCB of the electronic. Reference 15 is bottom cover of the electronic housing. Reference 16 is provision for AC magnetic core mounting place. (AC magnetic field is not used for this prototype). Reference 17 is PCB for sensing electronic. Reference 18 is electrodes contacting area. When snapped in position, the electrodes should make contact with the PCB shown as Reference 17.

Having thus described the preferred embodiment, the invention provides:

(1) An apparatus as liquid flow sensor comprising a disposable flow chamber integrated with one pair of electrode or multiple pairs of electrodes used to provide measurable flow rate data, wherein the voltage magnitude of flow generated in the disposable flow chamber represent the flow data.

(2) A method of building the disposable (replaceable) flow chamber with two essential parts: flow chamber housing and array of electrodes.

(3) A method of using analog switch to short the electrodes to one common potential as part of signal processing procedure.

(4) A method of shielding the flow chamber with an inverted voltage of the electrodes average.

(5) A method of making the magnetic gap to allow ease of insertion of flow chamber housing to the magnetic field.

(6) A method of interconnecting several pairs of electrodes to create stronger signal.

(7) A method of turning on and off, forward polarity and reverse polarity of the magnetic field to create a measurable noise reference.

(8) A method of generating stronger signal by making the flow chamber thinner for smaller magnetic gap, hence stronger magnetic field perpendicular to the pair of electrodes.

(9) A method of providing the signal shielding voltage potential equal to the inversed of the average voltage of the electrodes.

(10) A method of providing multiple magnetic sources to the flow chamber. Where the magnetic field direction presented at odd sequence of electrodes would have a phase shift of 180 degree with magnetic field direction of presented at the even electrodes. This magnetic field direction arrangement allows the summing of weak signal of several electrodes to one stronger flow signal.

The invention has been described with reference to the preferred embodiments. Obviously, modifications and alternations will occur to others upon reading and understanding the preceding detailed description. It is intended that the invention be construed as including all such modifications and alterations insofar as they come within the scope of the appended claims or the equivalents thereof.

What is claimed is:

1. An electro-magnetic flow sensor for measuring a flow rate of liquid, comprising:
   a micro controller; and
   a liquid flowing apparatus, which is communicatively linking to said micro controller, comprising:
   a flow chamber housing having a flow chamber for receiving the liquid therein;
   a magnetic source communicating with said flow chamber housing for generating a stable, single strength magnetic field within said flow chamber so as to allow said liquid exposing in said magnetic field; and
   an array of electrodes alignedly integrated with said flow chamber housing, said electrodes arranged in adjacent pairs spaced apart along a length of said flow chamber housing so that each electrode pair has opposing ends in contact with said flowing liquid to define an axial distance normal to said magnetic field and said flowing liquid and said spacing of said electrode pairs causes said magnetic field to induce in each electrode pair substantially the same voltage magnitude generated in said flow chamber when said liquid flows within said flow chamber under said magnetic field,
   wherein multiple voltage magnitudes of said electrode pairs are summed, said micro controller reads said summed voltage magnitude and converts said summed voltage magnitude into said flow data of said liquid.

2. The electro-magnetic flow sensor, as recited in claim 1, wherein said flow chamber is enclosed within said flow chamber for keeping said liquid therewithin in a contamination free manner.

3. The electro-magnetic flow sensor, as recited in claim 1, wherein said flow chamber housing comprises a disposable unit formed of molded polymer defining a uniform cross-section flow chamber extending to two ends adapted to be engaged with input and output liquid conduits, said liquid conduits defining bores of substantially the same internal diameter as the flow chamber, and said pairs of electrodes extend from said opposing ends to electrical contacts on an outside surface of said flow chamber so that, when removably installed in an electronic housing bearing said micro controller, said electrical contacts are in effective electrical contact with said micro controller, wherein said magnetic source comprises at least a magnetic coil or permanent magnet coupling with said flow chamber housing for detachably receiving said flow chamber housing thereat and is arranged in such manner that said magnetic core or said permanent magnet guides said magnetic field to said flow chamber.

4. The electro-magnetic flow sensor, as recited in claim 3, further comprising a voltage switching circuit electrically coupling with said magnetic source to provide said directional voltage, wherein when said voltage switching circuit provides forward voltage, said magnetic coil generates a positive magnetic field towards said flow chamber, and when said voltage switching circuit provides reverse voltage, said magnetic coil generates a negative magnetic field towards said flow chamber.

5. The electro-magnetic flow sensor, as recited in claim 1, wherein said magnetic source comprises at least a magnetic coil coupling with said flow chamber housing and at least magnetic core which has a magnetic gap detachably receiving said flow chamber housing thereat and is arranged in such manner that when a directional voltage is applied to said magnetic coil to generate said magnetic field, said magnetic core guides said magnetic field to said flow chamber.

6. A method of measuring a flow rate of liquid by an electro-magnetic flow sensor having a flow chamber, comprising the steps of:(a) receiving said liquid in said flow chamber;(b) applying a stable, single magnetic field in said flow chamber to allow said liquid exposing in said magnetic field;(c) an array of electrodes alignedly integrated with said flow chamber housing, said electrodes arranged in adjacent pairs spaced apart along a length of said flow chamber housing so that each electrode pair has opposing ends in contact with said flowing liquid to define an axial distance normal to said magnetic field and said flowing liquid and said spacing of said electrode Pairs causes said magnetic field to induce in each electrode pair substantially the same voltage magnitude generated in said flow chamber when said liquid flows within said flow chamber under said magnetic field and measuring a summed voltage magnitude of all the electrode pairs of flow generated in said flow chamber when said liquid flows within said flow chamber under said magnetic field; and (d) determining said flow rate of said liquid flow from said summed voltage magnitude.

7. The method as recited in claim 6, in step (b), wherein said magnetic field is generated by a magnetic coil and a magnetic core arranged in such manner that when a directional voltage is applied to said magnetic coil to generate said magnetic field, said magnetic core guides said magnetic field to said flow chamber.

8. The method as recited in claim 6, in step (b), wherein said magnetic field is applied to said flow chamber at a position perpendicular to said flow of liquid.

9. The method as recited in claim 8, in step (b), wherein said magnetic field is a polarity magnetic field that a forward voltage is provided to generate a positive magnetic field towards said flow chamber and a reverse voltage is provide to generate a negative magnetic field towards said flow chamber.

10. The method as recited in claim 9, wherein said flow chamber is an enclosed chamber for keeping said liquid therewithin in a contamination free manner.

11. The method as recited in claim 10, in step (c), wherein a plurality of electrode pairs positioning along said flow chamber in series to enhance a strength of measuring said voltage magnitude.

12. The method as recited in claim 11, in step (c), further comprising a step of filtering a noise signal from said voltage magnitude.

13. The method as recited in claim 6, wherein said flow chamber is an enclosed chamber for keeping said liquid therewithin in a contamination free manner.

14. The method as recited in claim 6, in step (c), wherein a plurality of electrode pairs positioning along said flow chamber in series to enhance a strength of measuring said voltage magnitude.

* * * * *